US008827782B2

(12) United States Patent
Dise et al.

(10) Patent No.: US 8,827,782 B2
(45) Date of Patent: Sep. 9, 2014

(54) AUGER DRIVE COUPLER ASSEMBLY HAVING A FRICTION CLUTCH FOR A COMBINE HARVESTER

(75) Inventors: Reuben Dise, Gordonville, PA (US); Cooper Wilhelm Linde, Lyndell, PA (US); Terry Scott Moyer, Denver, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/600,674

(22) Filed: Aug. 31, 2012

(65) Prior Publication Data
US 2014/0066149 A1   Mar. 6, 2014

(51) Int. Cl.
*A01D 17/02* (2006.01)
*A01F 12/46* (2006.01)

(52) U.S. Cl.
USPC .......................................... 460/114

(58) Field of Classification Search
USPC ........... 460/114; 414/505, 526; 198/668, 666, 198/632, 313, 314, 672
See application file for complete search history.

(56) References Cited

U.S. PATENT DOCUMENTS

| 796,477 | A | * | 8/1905 | Wallace | 141/236 |
| 1,689,963 | A | * | 10/1928 | Pelton | 198/668 |
| 2,067,284 | A | | 1/1937 | Pearce | |
| 2,138,576 | A | * | 11/1938 | Gebert | 198/666 |
| 2,270,471 | A | * | 1/1942 | Pilcher et al. | 198/672 |
| 2,706,897 | A | | 4/1955 | Holoye | |
| 2,716,334 | A | | 8/1955 | Scott et al. | |
| 2,892,327 | A | * | 6/1959 | Kressin | 464/87 |
| 2,924,082 | A | | 2/1960 | Reich | |
| 3,205,682 | A | | 9/1965 | Porter | |
| 3,550,793 | A | | 12/1970 | Davidow et al. | |
| 3,670,913 | A | * | 6/1972 | Reaves | 414/505 |
| 3,775,998 | A | | 12/1973 | Century et al. | |
| 3,859,821 | A | | 1/1975 | Wallace | |
| 3,984,999 | A | * | 10/1976 | Kopp | 464/41 |
| 4,004,641 | A | * | 1/1977 | Hendrickson | 172/781 |
| 4,034,575 | A | | 7/1977 | Barth | |
| 4,572,356 | A | * | 2/1986 | Janick | 198/667 |
| 4,927,403 | A | | 5/1990 | Pate, Sr. | |
| 5,100,281 | A | * | 3/1992 | Grieshop | 414/526 |
| 5,224,898 | A | | 7/1993 | Johnson et al. | |
| 5,253,746 | A | * | 10/1993 | Friesen et al. | 198/550.2 |
| 5,588,916 | A | | 12/1996 | Moore | |
| 6,422,376 | B1 | * | 7/2002 | Nichols et al. | 198/668 |
| 6,533,105 | B1 | | 3/2003 | Dutschke | |
| 6,681,871 | B2 | * | 1/2004 | Drumm et al. | 175/19 |

(Continued)

FOREIGN PATENT DOCUMENTS

GB        1262041        2/1972

*Primary Examiner* — Árpád Fábián-Kovács
(74) *Attorney, Agent, or Firm* — Patrick M. Sheldrake; Seyed V. Sharifi T.

(57) ABSTRACT

An unload auger assembly for a combine harvester includes a drive coupler configured between adjacent first and second auger segments. The coupler includes a driver component and associated driver cog coupled to the first auger segment. A driven component and associated driven cog is coupled to the second auger segment. The driven cog is rotationally engaged by the driver cog to transmit rotational drive from the first auger segment to the second auger segment. A friction clutch is configured in-line between the driver component and driven component and rotationally couples the driver component to the driven up to a release torque value wherein the friction clutch disengages the driver component from the driven component.

8 Claims, 6 Drawing Sheets

(56) References Cited

U.S. PATENT DOCUMENTS

| | | | |
|---|---|---|---|
| 6,776,569 B1 * | 8/2004 | McMahon et al. | 414/505 |
| 6,908,380 B2 | 6/2005 | Silver | |
| 7,168,554 B2 * | 1/2007 | Brandt | 198/668 |
| 7,287,639 B2 * | 10/2007 | Brandt | 198/668 |
| 7,367,881 B2 | 5/2008 | Voss et al. | |
| 7,393,275 B2 * | 7/2008 | Voss et al. | 460/114 |
| 7,494,409 B2 * | 2/2009 | Voss et al. | 460/114 |
| 7,946,355 B1 | 5/2011 | Kluge | |
| 8,033,377 B2 | 10/2011 | Reimer et al. | |
| 2007/0102260 A1 | 5/2007 | Reimer et al. | |

* cited by examiner

AUGER DRIVE COUPLER ASSEMBLY HAVING A FRICTION CLUTCH FOR A COMBINE HARVESTER

FIELD OF THE INVENTION

The present invention relates generally to an unload auger in a combine harvester, and more particularly to a coupler assembly between a driver auger segment and a driven auger segment in the unload auger.

BACKGROUND OF THE INVENTION

Agricultural combines are available in various designs and models to perform the basic functions of reaping crop materials from a crop field, separating the grain from the non-grain crop materials, and discarding the non-grain crop materials back onto the crop field.

A typical combine includes a crop harvesting apparatus, or header, which reaps ripened crop plants from the field and feeds the crop materials to a separating or threshing system. Several different types of threshing systems are available, such as rotary threshers and straw walkers. Regardless of the type of threshing system used, the thresher generally operates to separate the materials other than grain (MOG) from the grain heads. The MOG primarily consists of grain stalks and exits the thresher along its rear end. The grain exits along the bottom side of the thresher and passes to a series of moving sieves that separate the grain from the unwanted fine materials, sometimes referred to as chaff. After separation, the grain is directed to a grain bin by an auger system, and the unwanted fine materials exit the sieves along the rear end of the combine.

The grain bin serves as a temporary onboard storage location for the grain. Typically, the grain bin is positioned above the threshing system and can have a capacity of as much as 200 bushels or more for larger combines. As the combine harvests the crop field, the grain bin periodically becomes filled with grain and must be emptied to allow the combine to further operate. The grain is transferred from the grain bin to a truck or a grain cart through an unloading auger.

In a common configuration, the unloading auger is positioned along the upper side of the combine with an infeed section of the auger located adjacent to the grain bin and pivotally attached to the combine to allow rotation about a nearly vertical axis. An elbow connects the infeed section to a long horizontal section that can rotate in a generally horizontal plane around the infeed section to allow unloading of the grain into a truck or grain cart located alongside the combine. After unloading, the unloading auger is rotated back so that the horizontal section trails towards the rear of the combine with the exit end of the auger located near the combine's back end.

As combines grew larger, the relatively longer length of the unload auger horizontal section became problematic for manufacturers and operators alike. A solution was developed to effectively increase the length of the horizontal section during unloading, yet maintain a shorter, compact configuration in the stored/transport position of the unload auger. The horizontal section was defined by folding auger segments that could pivot relative to each other from a folded position into an in-line operational position, with drive couplers configured at the hinged joint between the respective folding segments. Reference is made, for example, to U.S. Pat. No. 6,908,380 for a discussion of such a system.

With a known type of drive coupler between the folding auger segments, a single drive lug or cog on a driver component rotationally engages a single tooth or cog on the driven component. This arrangement is beneficial in that it effectively rotationally disconnects the downstream auger segments for about a full revolution of the driver, thereby limiting the starting torque and allowing the driver component to generate some degree of rotational momentum prior to engaging the driven auger segment. In addition, this arrangement allows the augers to always be properly timed with respect to each other. By having only one cog or lug on each auger segment, the segments will have the same orientation with respect to each other every time the system is engaged.

The single cog auger segment arrangement, however, also has inherent drawbacks. Upon engaging the unload system, a relatively loud mechanical "clunk" noise is generated when the driver cog impacts the driven cog, which can be disconcerting to some operators. In addition, a significant and sudden torque spike is generated when the cogs impact, which induces stresses along the entire auger dive train.

Thus, the industry would benefit from an unload auger that maintains the benefits of the single driver cog/driven cog coupler while eliminating the inherent drawbacks of such coupler.

BRIEF DESCRIPTION OF THE INVENTION

Aspects and advantages of the invention will be set forth in part in the following description, or may be obvious from the description, or may be learned through practice of the invention.

In accordance with aspects of the invention, an unload auger assembly is provided for a combine harvester. The auger assembly includes a first auger segment and a second auger segment, wherein the first auger segment rotationally drives the second auger segment. A drive coupler is operably configured between the first auger segment and the second auger segment. The drive coupler includes a driver component coupled to the first auger segment, with the driver component having a driver cog. A driven component is coupled to the second auger segment, with the driven component having a driven cog that is rotationally engaged by the driver cog to transmit rotational drive from the first auger segment to the second auger segment. A friction clutch is operably configured in-line between the driver component and the driven component. Upon initial start-up of the unload auger, the friction clutch rotationally couples the driver component to the driven component prior to the driver cog engaging the driven cog up to a design release torque value at which the friction clutch then disengages the driver component from the driven component. Thus, in a low or no-load condition of the second auger segment, the drive coupler will impart rotational drive to the second auger segment upon start-up of the unload auger. As torque increases between the auger segments, the friction clutch will slip while the driver cog continues to rotate to an impact position against the driven cog, which may still be rotating (or is a least at a closer rotational position to the driver cog). Thus, the noise and torque spike caused by impact of the cogs are reduced.

The drive coupler has utility between any two axially aligned auger segments. In a particular embodiment, the auger segments are components of a folding horizontal section of the unload auger, wherein the second auger segment is an outboard unfolding auger segment relative to the first auger segment, which may also be a folding segment relative to an additional upstream auger segment.

It should be appreciated that the friction clutch may be variously configured and encompasses any type of conventional clutch mechanism that disengages the driver component from the driven component upon reaching a design torque value between the components. Various such devices are well-known. In a particular embodiment, the friction clutch includes a first slip plate disposed between and end face of the driver component and an end face of the driven component. The slip plate frictionally engages the components up to a design release torque at which the plate rotationally slips and allows relative rotational slip between the components.

A particular embodiment may include a compression disc disposed adjacent to the first slip plate. This compression disc is formed of a compressible material, such as a natural or synthetic rubber-like material, and induces the slip to occur between the opposite face of the friction disc and adjacent driver or driven component. For example, the compression disc may be disposed between the driver component and the first plate, wherein the slip is induced primarily between the friction plate and the driven component.

In a further embodiment, the drive coupler includes a second slip plate operably disposed between the driver component and the driven component such that the compression disc is sandwiched between the first and second slip plates. With this embodiment, the induced slip is generally split between the driver and driven components, which may minimize wear of the respective plates.

In still another embodiment, the drive coupler may include an axial biasing element, such as a spring, disposed relative to one of the driver component or driven component to bias the components together. This configuration may be desired to ensure that the slip plate remains engaged between the components in various operating conditions of the unload auger. For example, the spring may reduce or eliminate the need for shimming to maintain axial alignment between the auger segments, and would also ensure engagement of the driver and driven components as the friction plate wears. The axial biasing spring may be used with any of the friction clutch embodiments set forth herein.

It should be understood that the present invention also encompasses any configuration of a combine harvester that utilizes an unload auger assembly as set forth herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
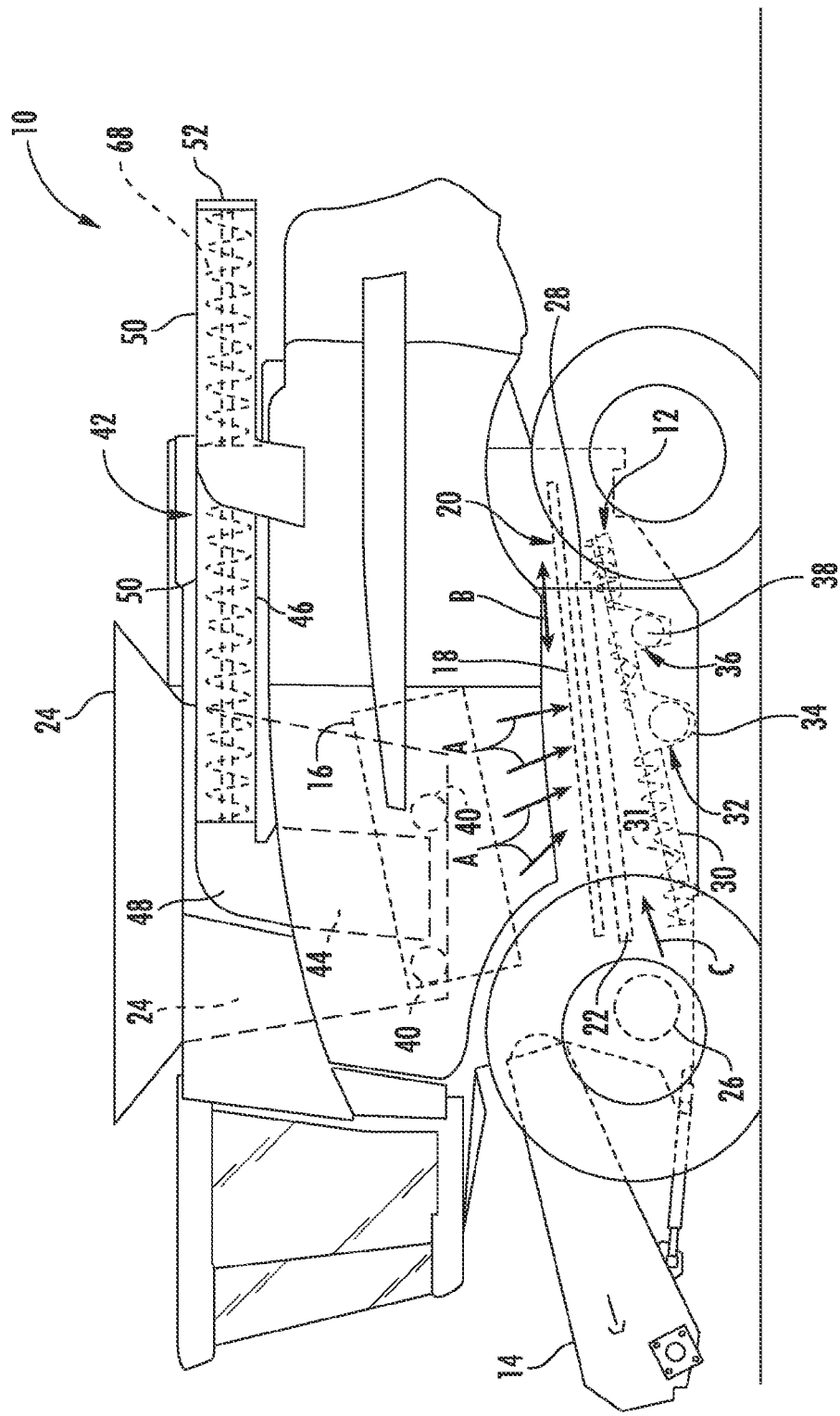
FIG. 1 is a side view of a conventional combine harvester.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, wherein like numbers refer to generally like items or features, FIG. 1 depicts a conventional combine harvester 10 having a feeder house 14 on a front end thereof. A header (not shown) is connectable to the feeder house 14 to sever a swath of crops from a field as the combine 10 moves forward and to convey the severed crops to feeder house 14. Feeder house 14 includes an internal conveying system (not shown) for conveying the crops upwardly and rearwardly into the body of the combine 10 and into an inlet of a separating or threshing system 16. Threshing system 16 generally includes a rotor at least partially enclosed in a concave defining an arcuate space therebetween where crop material is processed for separating grain from material other than grain (MOG) and straw, with the MOG being ejected rearwardly from the threshing system 16 through the rear end of the combine 10 for deposit on the field, as is well-known.

As threshing system 16 operates, crop material will fall and/or be conveyed therefrom, as denoted generally by arrows "A" in FIG. 1, onto an upper sieve 18 of a cleaning system 20 located below threshing system 16 within the body of combine 10. A typical cleaning system 20 also includes a lower sieve 22 positioned below upper sieve 18 in a stacked relationship therewith. The sieves 18 and 22 are configured to be reciprocally moved or vibrated relative to one another to effect a sifting of material falling onto the upper sieve 18, as indicated by arrow "B" in FIG. 1.

As the crop material from the threshing system 16 falls onto upper sieve 18, air from a fan 26 is blown upwardly and rearwardly through sieves 18 and 22, as indicted by arrow "C" in FIG. 1. In conventional combines, this combination of air flow and the vibratory movement of the sieves 18 and 22 is meant to cause the lighter elements of the MOG (also referred to as chaff) to be blown upwardly and rearwardly away from sieves 18 and 22. Such chaff is typically blown into an optional chaff spreader (not shown), operable for distributing the chaff over a desired swath of the field from which the crop is cut, or directed into an optional chopper (also not shown), operable for mixing the chaff with straw for chopping and distributing such mix, or simply directed downwardly onto the field through a rear opening of the combine, all of which operations are well-known in the art.

The grain that falls through lower sieve 22 into a clean grain and tailings system 12 of the combine 10 is considered to be clean grain that is desired to be collected and ultimately conveyed to a grain tank 24. The tailings that are allowed to pass through the upper sieve 18 often still contain some un-separated grain, and retention of such tailings for further processing to effect separation of the grain is generally desired. The tailings that are unable to pass through the smaller openings on lower sieve 22 are caused to move towards a rear peripheral edge portion 28 of sieve 22, and to fall by the vibratory movement of lower sieve 22 into clean grain and tailings system 12 for further processing.

A clean grain auger trough 32 is disposed generally crosswise to and in communication with a plurality of clean grain collecting troughs 30 for receipt and further conveyance of the clean grain. A tailings auger trough 36 is disposed generally cross-wise to and in communication with the tailings receiving portion of the collecting troughs 30.

An elongated, helical auger 31 is supported in each collecting trough 30 and is connected to a drive mechanism, for example by a bevel gear on the rear end of auger 62 that meshes with a drive gear rotated by any suitable drive, such as a belt, chain or shaft, in connection with a power plant of combine 10 (not shown).

When augers 31 are rotated in a predetermined rotational direction, different flight portions of the auger will convey clean grain and tailings separately and simultaneously along collecting troughs 30, with clean grain from the clean grain collecting troughs being moved into clean grain auger trough 32 and tailings from the tailings collector troughs being moved into tailings auger trough 36. Clean grain auger trough 32 has a helical auger 34 associated therewith and tailings auger trough 36 has a similar auger 38 associated therewith, which augers are rotatable in the conventional manner using suitable drives (not shown) for conveying the clean grain and tailings, respectively, to a clean grain elevator (not shown in FIG. 1) and a tailings return system (also not shown), in well-known manners. The clean grain elevator conveys the grain into the grain bin 24.

As schematically represented in FIG. 1, the grain in the grain bin 24 is moved by a pair of grain bin augers 40 at the bottom of the bin 24 towards the intake end of a generally vertical infeed section 44 of the unload auger 42. A generally horizontal section 46 of the unload auger 42 is connected to the infeed section 44 via an elbow 48 and pivots relative to the axis of infeed section 44 so as to swing away from the side of the combine 10 for unloading the grain to a bin or vehicle alongside of the combine 10. As discussed above, the horizontal section 46 may include one or more folding auger segments 50 that pivot and align at a joint 52 to effectively lengthen the horizontal section 46 for the unloading process, yet fold to provide a relatively compact horizontal section 46 during harvesting operations of the combine 10, as well as transport and storage of the combine 10. The upstream auger segment 50 is typically the driven segment that engages and drives the downstream (in the grain conveying direction) segment 50.

Figure 2:
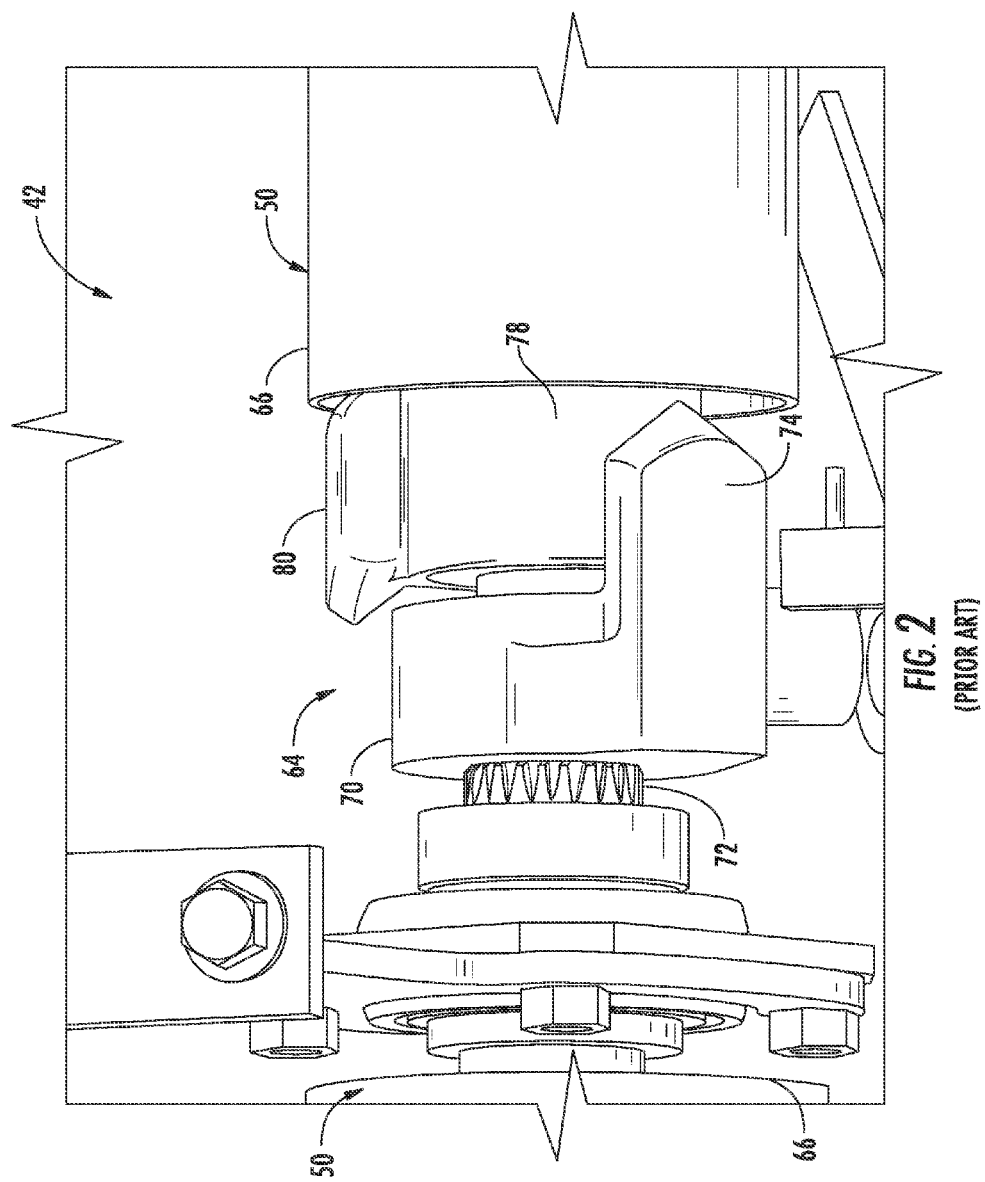
FIG. 2 is a side perspective view of components of a conventional unload auger.

FIG. 2 depicts a prior art drive coupler assembly 64 between unfolding auger segments 50. This drive coupler assembly 64 is typically configured at the joint 52 (FIG. 1) of the various auger segments 50 in the horizontal section 46 of the unload auger 42, as is well known in the art. The individual auger segments 50 may be variously configured. In a typical configuration, each of the auger segments 50 may include a sleeve member 66 on which is mounted a helical auger element 68 (FIG. 1 and FIG. 3), the helical auger elements 68 serve to convey the grain in an unload direction as the auger segments 50 are rotated. The drive coupler assembly 64 in the conventional embodiment depicted in FIG. 2 may include a hub 72 of any conventional construction mounted at the axial end of one of the auger segments 50. A driver component 70 is mounted on the hub 72 and includes a drive cog 74. A driven compartment 78 is mounted on the axial end of the adjacent auger segment 50, for example on any manner of hub, shaft, or other member. The driven component 78 includes a driven cog 80 configured thereon. As described above with respect to such prior art configurations, when the driver component 70 is rotationally driven, the single drive cog 74 will rotationally impact against the driven cog 80 in order to transmit rotational drive to the adjacent auger segment 50. Because of the single drive cog 74 and driven cog 80 configurations, the drive cog 74 may rotate essentially a full revolution before impacting against the driven cog 80, producing the objectionable ("clunk") noise, as well as the torque spike described above.

Figure 3:
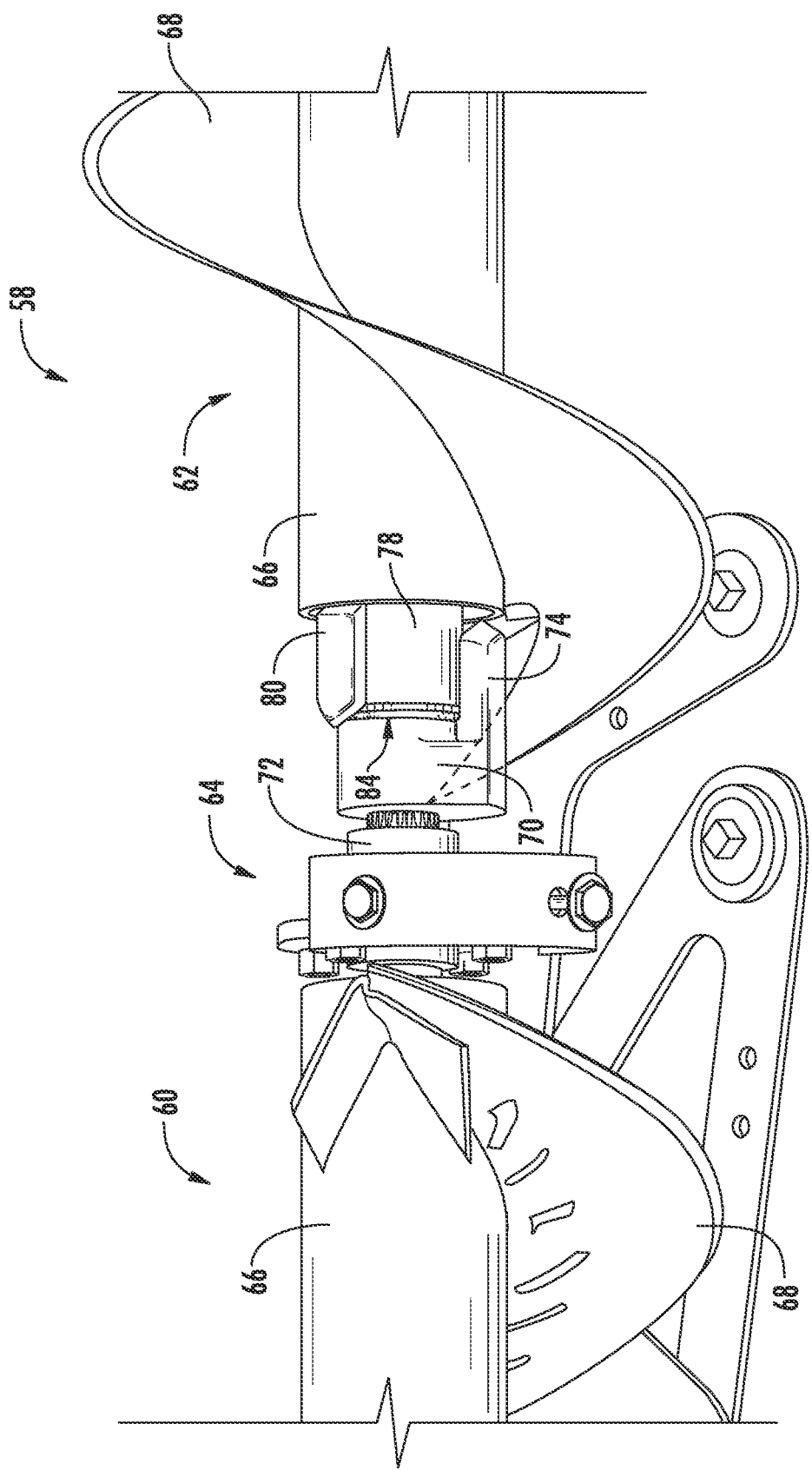
FIG. 3 is a side perspective view of an embodiment of an unload auger assembly in accordance with aspects of the invention.

FIG. 3 depicts an embodiment of an unload auger assembly 58 in accordance with principles of the present disclosure. The auger assembly 58 includes a first auger segment 60 axially aligned with a second auger segment 62. It should be appreciated that the auger segments 60 and 62 may be components of an unfolding horizontal auger segment 46 of a combine unload auger 42, as depicted in FIG. 1. The first auger segment 60 transmits rotational drive to the second auger assembly 62. A drive coupler 64 is configured between the aligned axial ends of the first auger segment 60 and second auger segment 62. In the illustrated embodiment, the drive coupler 64 includes a driver component 70 that rotationally engages a driven component 78. These components 70, 78 may be constructed as described above with respect to the embodiment of FIG. 2.

A friction clutch 84 is configured inline between the driver component 70 and the driven component 78. This friction clutch 84 rotationally couples the driver component 70 to the driven component 78 so that the second auger segment 62 is rotationally driven by the first auger segment 60 upon startup of the auger even before rotational engagement of the drive cog 74 against the driven cog 80, particularly in a low or no-load condition of the auger segments 60, 62. Rotational torque between the driver component 70 and driven component 78 will increase as the driver component 70 continues to rotate until the torque reaches a release value wherein the friction clutch 84 "slips" or otherwise disengages the driver component 70 from the driven component 78. At this release torque value, rotational drive is no longer transmitted to the driven component 78 and the driver component 70 continues to rotate until the drive cog 74 rotationally impacts and engages the driven cog 80. However, due to the initial degree of rotational drive transmitted to the second auger segment 62 via the friction clutch 84, the second auger segment 62 is rotating at least to a certain degree when the drive cog 74 impacts the driven cog 80. Thus, the objectionable "clunk" noise and torque spike experienced by the auger components in the embodiment of FIG. 2 is significantly reduced in the embodiment of FIG. 3 in accordance with aspects of the invention.

Figure 4:
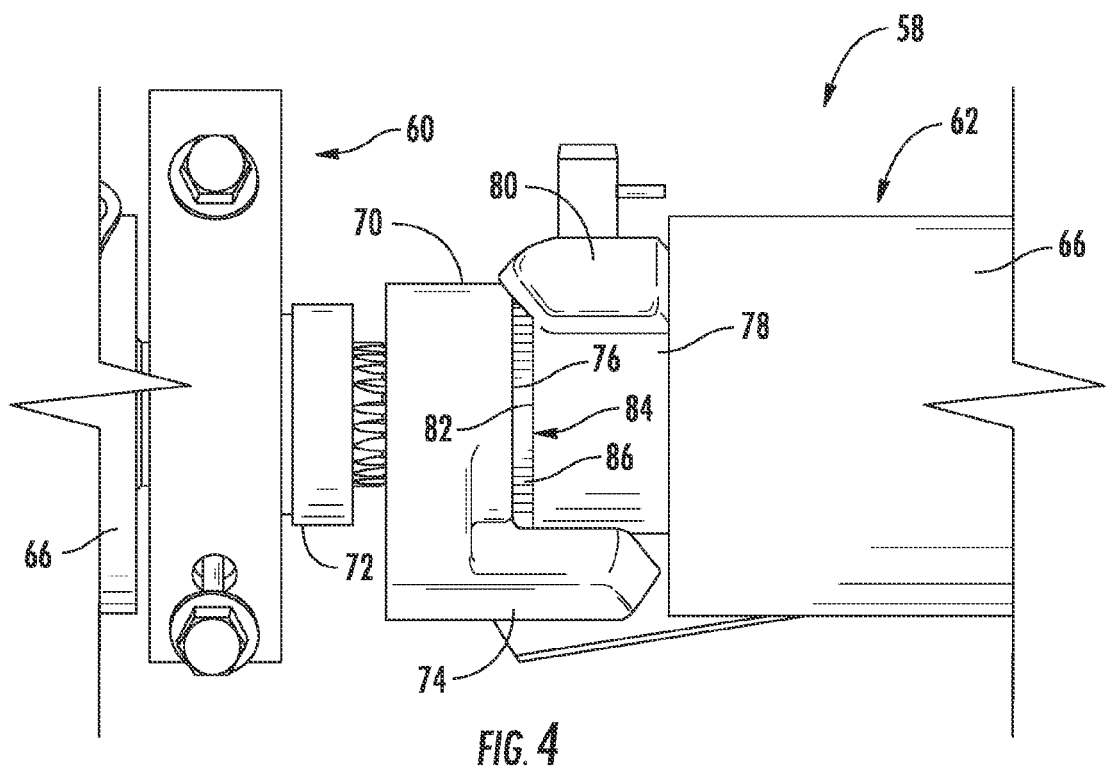
FIG. 4 is a side perspective view of an alternate embodiment of an unload auger assembly.

Various types of friction clutch devices 84 may be configured within the scope and spirit of the invention. Referring to the embodiment of FIG. 4, the friction clutch 84 is configured as a disc-shaped slip plate 86 disposed between an axial end face 76 of the driver component 70 and an axial end face 82 of the driven component 78. This slip plate 86 may be formed from any conventional brake shoe-type of material that frictionally engages the respective end faces 76, 82 in a non-slip manner up to a certain release torque, wherein the plate 86 slips relative to one or both of the end faces 76, 82 and slip is induced relative to the driver component 70 and driven component 78. The slip plate 86 is made of a material suitable for withstanding the frictional heat that may be generated, as well as the operating environment of the unload auger assembly 58. It should be appreciated that the slip plate 86 is not limited by any particular type of material.

Figure 5:
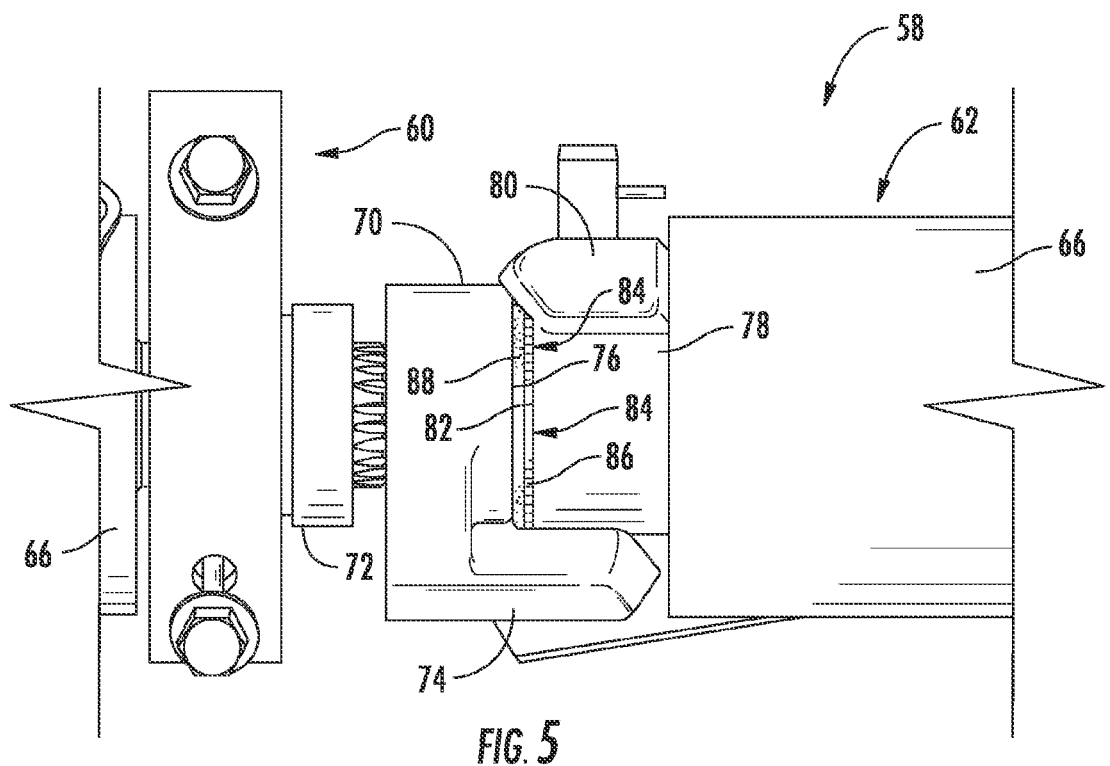
FIG. 5 is a side perspective view of yet another embodiment of an unload auger assembly.

In the embodiment of FIG. 5, the friction clutch 84 includes an additional compression disc 88 disposed adjacent to the slip plate 86. This compression disc 88 may be formed of any suitable natural or synthetic compressible, rubber-like material that, in an operating condition of the auger assembly 58, compresses between the slip plate 86 and adjacent driver component 70 or driven component 78 (depending on location of the compression disc 88). The compression disc 88 serves to induce the slip between the slip plate 86 and a respective one of the driver component 70 or driven component 78. For example, in the embodiment of FIG. 5 wherein the compression disc 88 is disposed between the end face 76 of the driver component 70 and slip plate 86, the slip will be induced between the slip plate 86 and end face 82 of the driven component 78.

Figure 6:
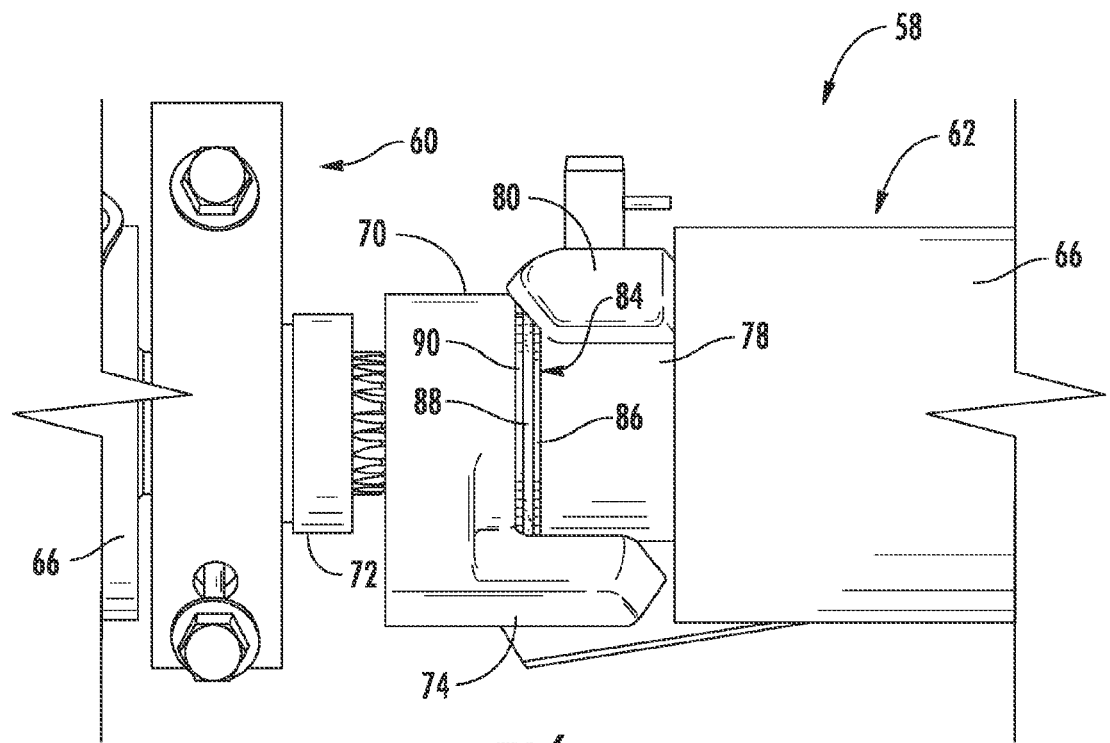
FIG. 6 is a side perspective view of still another embodiment of an unload auger assembly.

FIG. 6 depicts an embodiment wherein the compression disc 88 is sandwiched between opposite slip plates 86, 90. This configuration results in the induced slip essentially being split between the driver component 70 and driven component 78. In other words, the driver component 70 will slip relative to the slip plate 90 disposed adjacent to its end face 76, while the driven component 78 will simultaneously slip relative to the slip plate 86 adjacent to its end face 82. This configuration may be desired to minimize wear of the respective friction clutch components, in particular the slip plates 86, 90.

Figure 7:
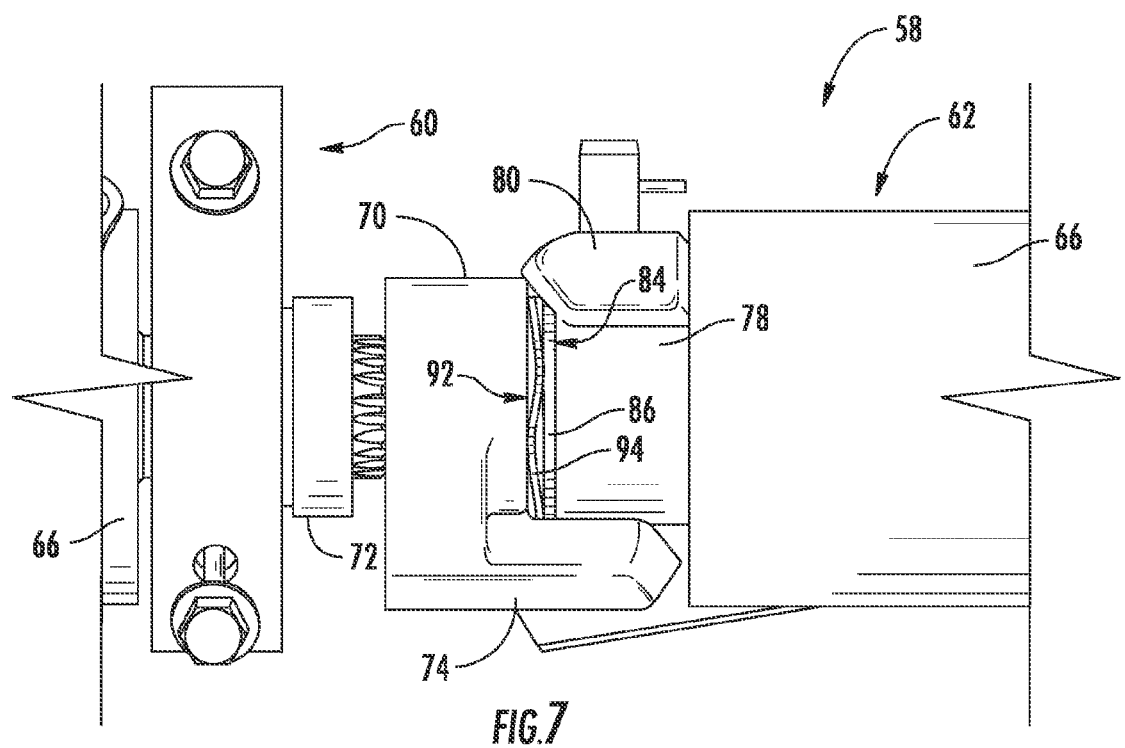
FIG. 7 is a side perspective view of another embodiment of an unload auger assembly.
Figure 8:
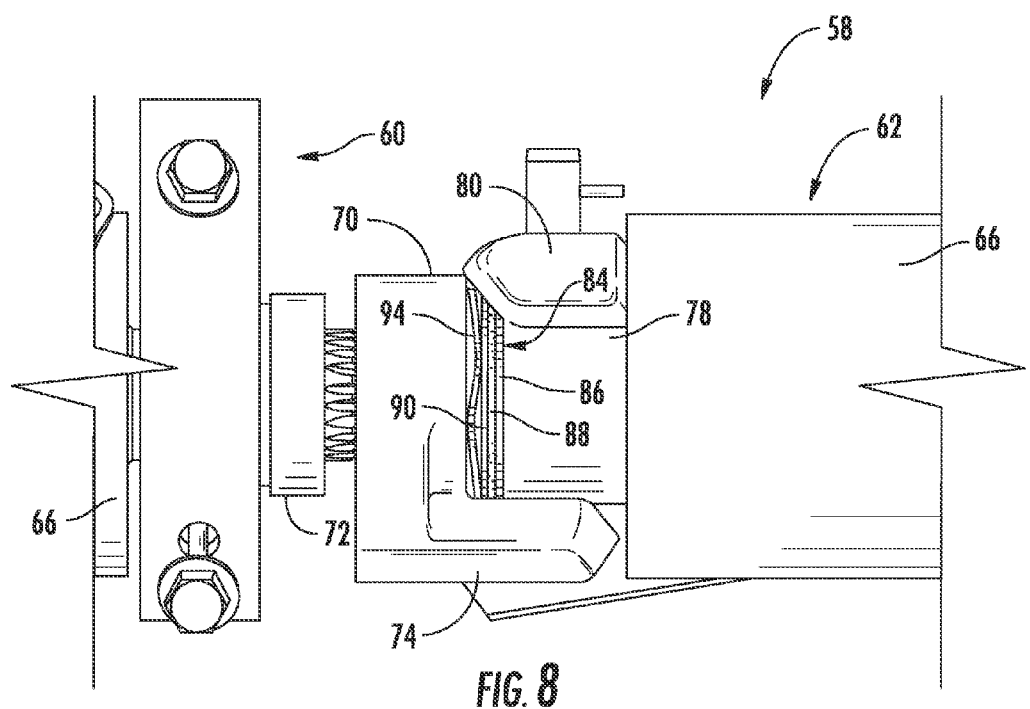
FIG. 8 is a side perspective view of yet another embodiment of an unload auger assembly in accordance with aspects of the invention.

FIGS. 7 and 8 depict embodiments of a friction clutch 84 that includes an axial biasing element 92 in-line between the driver component 70 and driven component 78. In the illustrated embodiments, this biasing element 92 is depicted as a spring 94, such as any manner of leaf spring, coil spring, washer spring, or the like. It should be appreciated that various types of biasing elements 92 may be utilized in this regard. The biasing element 92 may serve to ensure that the slip plate 86 remains engaged between the driver component 70 and driven component 78 in various operating conditions of the auger assembly 58. The biasing element 92 may also reduce or eliminate the need for shimming to maintain axial alignment between the adjacent auger segments 60, 62, or to ensure engagement of the driver component 70 with the driven component 78 as the components or slip plate 86 wear in normal operating conditions.

It should be understood that the biasing element 92 may be utilized in any of the friction clutch 84 embodiments described herein. For example, in the embodiment of FIG. 7, the biasing element 92 is a spring 94 disposed between the end face of the driver component 70 and the slip plate 86. In the embodiment depicted in FIG. 8, the friction clutch 84 includes a compression disc 88 sandwiched between opposite slip plates 86, 90. The biasing element in the form of spring 94 is disposed between the end face of the driver component 70 and the adjacent friction plate 90.

It should be appreciated that the present invention also encompasses any configuration of a combine harvester 10 (FIG. 1) that utilizes an unload auger assembly 58 in accordance with aspects set forth herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An unload auger assembly for a combine harvester, comprising:
   a first auger segment;
   a second auger segment;
   a drive coupler configured between said first auger segment and said second auger segment, said drive coupler further comprising:
      a driver component coupled to said first auger segment, said driver component having a driver cog;
      a driven component coupled to said second auger segment, said driven component having a driven cog that is rotationally engaged by said driver cog to transmit rotational drive from said first auger segment to said second auger segment;
      a friction clutch configured in-line between said driver component and said driven component, and within a perimeter defined by rotation of the driver cog and the driven cog, said friction clutch rotationally coupling said driver component to said driven component prior to engagement of said driver cog with said driven cog up to a release torque value, wherein said friction clutch disengages said driver component from said driven component and the friction clutch further comprises a first slip plate disposed between and end face of the driver component and an end face of the driven component;
      a compression disc disposed adjacent said first slip plate, said compression disc formed from a compressible material; and
      a second slip plate disposed between the driver component and the driven component such that the compression disc is sandwiched between the first slip plate and the second slip plate.

2. The unload auger assembly as in claim 1, wherein said second auger segment is an outboard unfolding auger segment relative to said first auger segment.

3. The unload auger assembly as in claim 1, further comprising an axial biasing element disposed relative to one of said driver component or said driven component.

4. The unload auger assembly as in claim 3, wherein said friction clutch comprises a first slip plate disposed between and end face of said driver component and an end face of said driven component, said biasing element comprising a spring disposed so as to bias said slip plate against said driven component.

5. A combine harvester, comprising:
   a storage bin;
   an unloading auger movable between a storage position and an unloading position for unloading a crop material from said storage bin, said unloading auger including a horizontal section in communication with the storage bin, said horizontal section including a first auger segment and a second auger segment, said first segment and said second segment being pivotal relative to one another at a hinged joint;
   a drive coupler configured between said first auger segment and said second auger segment, said drive coupler further comprising:
      a driver component coupled to said first auger segment, said driver component having a driver cog;
      a driven component coupled to said second auger segment, said driven component having a driven cog that is rotationally engaged by said driver cog to transmit rotational drive from said first auger segment to said second auger segment;

a friction clutch configured in-line between said driver component and said driven component, said friction clutch rotationally coupling said driver component to said driven component prior to engagement of said driver cog with said driven cog up to a release torque value wherein said friction clutch disengages said driver component from said driven component, the friction clutch further comprises a first slip plate disposed between and end face of the driver component and an end face of the driven component;

a compression disc disposed adjacent said first slip plate, said compression disc formed from a compressible material; and a second slip plate disposed between the driver component and the driven component such that the compression disc is sandwiched between the first slip plate and the second slip plate.

6. The combine harvester as in claim 5, wherein said second auger segment is an outboard unfolding auger segment relative to said first auger segment.

7. The combine harvester as in claim 5, further comprising an axial biasing element disposed relative to one of said driver component or said driven component.

8. The combine harvester as in claim 7, wherein said friction clutch comprises a first slip plate disposed between and end face of said driver component and an end face of said driven component, said biasing element comprising a spring disposed so as to bias said slip plate against said driven component.

\* \* \* \* \*